US009264323B2

(12) United States Patent
Bodine et al.

(10) Patent No.: US 9,264,323 B2
(45) Date of Patent: Feb. 16, 2016

(54) CONTROLLING COMPUTER NODES THROUGH SOCIAL MEDIA (71) Applicant: CA, Inc., Islandia, NY (US)

(72) Inventors: Gregory Lewis Bodine, Cary, NC (US); Don Kleinschnitz, Sandy, UT (US); Josef Bodine, Austin, TX (US); James D. Kleinschnitz, Park City, UT (US)

(73) Assignee: CA, Inc., New York, NY (US)

( * ) Notice: Subject to any disclaimer, the term of this patent is extended or adjusted under 35 U.S.C. 154(b) by 157 days.

(21) Appl. No.: 14/102,203

(22) Filed: Dec. 10, 2013

(65) Prior Publication Data

US 2015/0163103 A1   Jun. 11, 2015

(51) Int. Cl.
G06F 11/00 (2006.01)
H04L 12/26 (2006.01)
G06F 11/07 (2006.01)

(52) U.S. Cl.
CPC ............ *H04L 43/04* (2013.01); *G06F 11/0784* (2013.01)

(58) Field of Classification Search
CPC .................................................. G06F 11/3006
See application file for complete search history.

(56) References Cited

U.S. PATENT DOCUMENTS

| 6,138,049 | A  | * | 10/2000 | McLaughlin ................... 700/67 |
| 7,283,463 | B2 | * | 10/2007 | Miller et al. .................. 370/216 |
| 7,899,934 | B2 | * | 3/2011  | Slaughter et al. ............ 709/245 |
| 8,713,165 | B2 | * | 4/2014  | Bharadwaj ..................... 709/224 |
| 2004/0027995 | A1 | * | 2/2004 | Miller et al. .................. 370/254 |
| 2011/0265017 | A1 | * | 10/2011 | Stovicek et al. .............. 715/752 |
| 2012/0226803 | A1 | * | 9/2012 | Bharadwaj ..................... 709/224 |
| 2013/0191185 | A1 | * | 7/2013 | Galvin ........................ 705/7.37 |
| 2014/0372204 | A1 | * | 12/2014 | Jordan et al. ............... 705/14.45 |
| 2014/0379721 | A1 | * | 12/2014 | Miasnik et al. ............... 707/738 |

* cited by examiner

*Primary Examiner* — Christopher McCarthy
(74) *Attorney, Agent, or Firm* — Myers Bigel Sibley & Sajovec, P.A.

(57) ABSTRACT

Some embodiments are directed to a computer node that communicates a report message containing information to a social media server to cause publishing of the information to other computer nodes tracking publishing on the social media server by the computer node. The computer node receives a response message from one of the other computer nodes through the social media server, and operates based on the response message. Related embodiments are directed to another computer node that communicates with a social media server to track information published by report messages from other computer nodes, generates a response message based on the information published by one of the other computer nodes, and communicates the response message to the social media server to cause publishing of content of the response message to the other computer nodes.

14 Claims, 5 Drawing Sheets

CONTROLLING COMPUTER NODES THROUGH SOCIAL MEDIA

TECHNICAL FIELD

The present invention relates generally to a networked system of computer nodes and, more particularly, to the management of computer nodes within the system.

BACKGROUND

Computer nodes, such as consumer and enterprise computer equipment, have many different operational techniques for identifying faults and performing remedial actions. Some computer nodes are configured to communicate information identifying operational conditions (e.g., such as a fault) to an administrator person through a user interface and/or to an administrator computer node through an application programming interface, and to request instructions therefrom as to responsive actions (e.g., remedial actions that can be taken to overcome the fault).

These communications are directed to only a particular administrator person and/or administrator computer node that has been previously defined through operational settings within the computer node. However, limiting these communications in this manner can hinder the ability of the computer node to obtain accurate and timely analysis of the operational condition and responsive actions thereto.

SUMMARY

Some embodiments disclosed herein are directed to a computer node that communicates a report message containing information to a social media server to cause publishing of the information through the social media server to other computer nodes tracking publishing on the social media server by the computer node. The computer node receives a response message from one of the other computer nodes through the social media server, and operates based on the response message.

In some further embodiments, the computer node communicates the report message through posting or web feed to the social media server with an identifier that is tracked by the other computer nodes. The computer node may select, based on content of the report message, the identifier from among a plurality of defined identifiers that identify different groupings of messages published by the social media server which can be separately tracked by the other computer nodes. The report message may contain information that indicates a possible operational fault associated with the computer node or a device monitored by the computer node, and one or more of the other computer nodes can analyze the possible operational fault and provide associated analysis to the computer node through the response message published through the social media server.

Some other embodiments are directed to a computer node that communicates with a social media server to track information published on the social media server by report messages from a plurality of other computer nodes. The computer node generates a response message based on the information published on the social media server by one of the other computer nodes, and communicates the response message to the social media server to cause publishing of content of the response message through the social media server to the other computer nodes.

In some further embodiments, the computer node tracks information posted or web fed from the social media server having an identifier that is tracked by the computer node. The computer node may determine an operational condition of one of the other computer nodes based on the information, and select the identifier, from among a plurality of defined identifiers that identify different groupings of messages published by the social media server which can be separately tracked by the other computer nodes, based on the operational condition. The computer node may detect a possible operational fault of the other computer node based on the information, generate analysis information relating to the possible operational fault, and communicate the response message containing the analysis information to the one of the other computer nodes.

It is noted that aspects described with respect to one embodiment may be incorporated in different embodiments although not specifically described relative thereto. That is, all embodiments and/or features of any embodiments can be combined in any way and/or combination. Moreover, computer nodes, systems, methods, and/or computer program products according to embodiments will be or become apparent to one with skill in the art upon review of the following drawings and detailed description. It is intended that all such additional computer nodes, systems, methods, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

Various embodiments described herein may arise from deficiencies that have been identified in the context of how computer nodes within systems identify potential faults, assess the potential faults, and perform remedial actions. However, the embodiments disclosed herein are not limited to that context.

In accordance with some embodiments disclosed herein, a computer node communicates report messages that identify operational conditions or other status to other computer nodes through one or more social media servers, who are tracking publishing on the social media server by the computer node. The computer node then receives feedback via response messages from the other computer nodes through the one or more social media servers. The computer node uses the feedback to control its operation. Such communication from the computer node to the social media servers are not addressed to one particular computer node, but instead are received by all computer nodes who have registered with the social media server to track such postings or web feeds. In this manner, a computer node can seek assistance from a social media community of other computer nodes, who are not necessarily known or otherwise identified beforehand by the computer node, and who can leverage their collective knowledge base to provide desired analytical assistance to the computer node.

Figure 1:
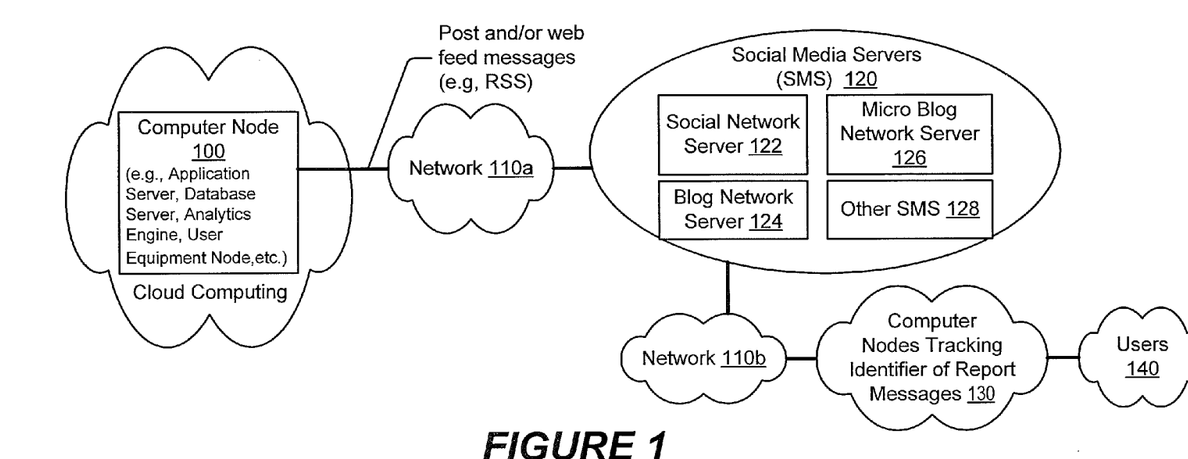
FIG. 1 is a block diagram of a computer node that publishes information through a social media server to other computer nodes who track the publications, and operates based on responses received through the social media server from the other computer nodes, in accordance with some embodiments.

FIG. 1 is a block diagram of a computer node 100 that publishes information through a social media server 120 to other computer nodes 130 who track the publications, and operates based on responses received through the social media server 120 from the other computer nodes 120, in accordance with some embodiments.

The computer node 100 communicates with one or more social media servers 120 via a data network 110a (e.g. public/private local area network, wide area network, etc.). The social media server 120 may be, but is not limited to, a social network server 122 (e.g., Facebook™), a blog network server 124 (e.g., Tumbler™, server providing Web2.0 Properties/Networks, etc.), a micro blog network server 126 (e.g., Twitter™), or another social media server 128. The social media server 120 receives messages containing information from the computer node 100, and publishes the information to other computer nodes 130 who have registered with the social media server 120 to track publishing of information on the social media server 120 by the computer node 100. The computer node 100 and/or one or more of the other computer nodes 130 may include, but are not limited to, a processing system, an application server, a database server, and/or an analytics engine which may be within a distributed cloud computing environment, and/or may be a user equipment node (e.g., smart phone, tablet computer, laptop computer, desktop computer).

The computer node 100 can communicate the information through a message posting and/or through a web feed messages (e.g., Really Simple Syndication (RSS)) to the social media server 120. The other computer nodes 130 can register with the social media server 120 to track publishing of information using conventional approaches directed to tracking publications identified as being from a particular person, particular device, and/or being associated with a particular subject (e.g., tracking Facebook™ friends postings, Twitter™ # message postings, etc.). The social media server 120 can publish the information by allowing the other computer nodes 130 to read/fetch the information from the social media server 120 and/or by delivering (e.g., pushing) the information to the other computer nodes 130. The other computer nodes 130 can communicate with the social media server 120 through a data network 110b, which may be separate from or part of the data network 110a.

The other computer nodes 130 or users 140 that operate the computer nodes 130 can analyze the published information and communicate response messages to the computer node 100. The computer node 100 can control its operation based on the response messages.

Figure 2:
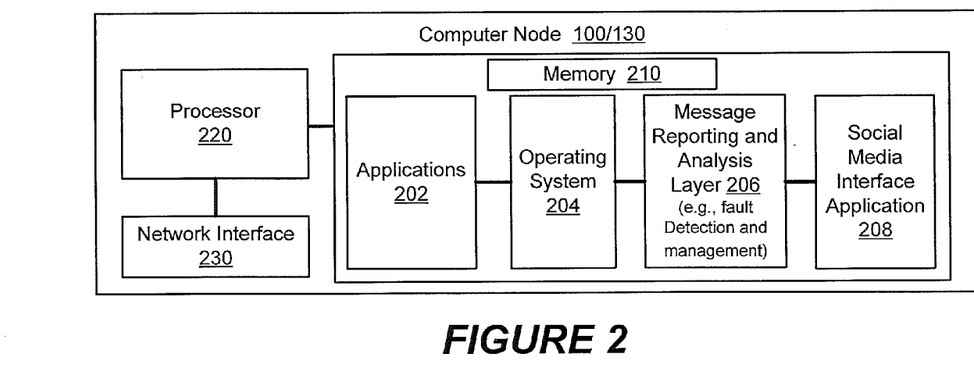
FIG. 2 is a block diagram of the computer node which communicates through the social media server of FIG. 1, in accordance with some embodiments.

FIG. 2 illustrates example hardware and software components of the computer node 100 and/or other computer node 130. The computer node 100/130 can include a network interface 230 which communicates via the network 110a/b with the social media server 120, a processor 220, and a memory 210 that contains computer program instructions. The processor 220 may include one or more data processing circuits, such as a general purpose and/or special purpose processor (e.g., microprocessor and/or digital signal processor), which may be collocated or distributed across one or more data networks (e.g., networks 110a-b). The processor 220 is configured to execute computer program instructions from the memory 210, described below as a computer readable medium, to perform some or all of the operations and methods for one or more of the embodiments disclosed herein.

The software can include applications 202 and an operating system 204. The operating system 204 can manage operation of the computer node 100/130 and execution of the applications 202, including managing resource utilization (e.g., processor utilization, memory allocation/utilization, network communication allocation/utilization, peripheral device allocation/utilization, etc.). A message reporting and analysis layer 206, which may be at least partially incorporated into the operating system 204, can operate to monitor system operation to detect occurrence of conditions that are to be reported in messages to the social media server 120 that are indicative of faults and to carryout remedial operations to attempt to eliminate faults. Communication with the social media server 120 may occur through a social media interface application, which may operate to register the computer node 100/130 for publishing information, tracking information published by others, etc.

Figure 3:
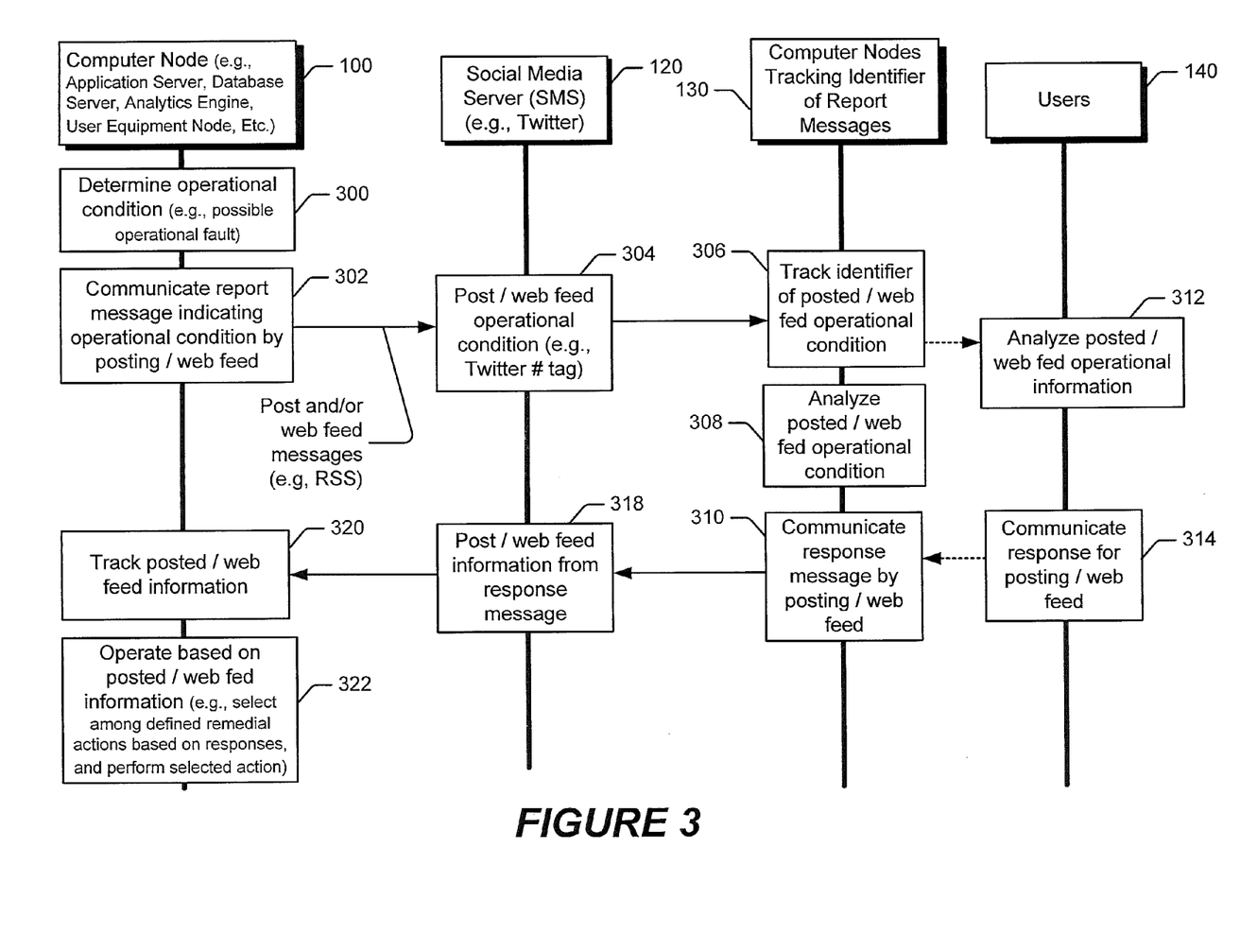
FIG. 3 is a flowchart of operations and information flows that may occur between the components of FIG. 1, in accordance with some embodiments.

FIG. 3 illustrates example operations and information flows that may occur between the components of FIG. 1. Through these operations and information flows, a computer node can leverage the collective knowledgebase of a community of other computer nodes and/or users who have a shared social media connection (e.g., a community of the same brand or model of computer systems, hardware components, operating systems, software applications, etc.) to assess and provide assistance to one another with fault identification and remedial action, resource planning, and/or any other operations of the computer system.

The computer node 100 can operate to determine (block 300) an operational condition of the computer node 100 or a device monitored by the computer node 100. A monitored device may include, but is not limited to, an environmental sensor, a personal monitoring sensor (e.g., heart rate monitor, blood pressure monitor, speed sensor, location sensor, etc.), a machine, an operational analysis software layer on a computer device, or another computer node. Operational conditions may be monitored according to one or more defined rules. The computer node 100 generates information indicative of the operational condition, and communicates (block 302) the report message containing the information to the social media server 120 to cause publishing of the information to the other computer nodes 130 which are tracking such publishing. The report message may contain a text string informational description of the determined operational condition, a picture (e.g., graph) of operational state values, a movie (e.g., animated graph, video from a video camera, etc.), or any other format that can be communicated to the social media server 120 for publication to the other computer nodes 130.

In one embodiment, the information included in the report message sent by the computer node 100 to the social media server 120 for publication indicates at least one of an error arising while processing an application on the computer node 100, a protected memory space access violation by an application while being processed on the computer node 100, an available memory space of the computer node 100 that is usable to process an application not satisfying a defined threshold, an available communication bandwidth of the computer node 100 that is usable by an application not satisfying a defined threshold, and an available processing bandwidth of the computer node 100 that is used to process an application not satisfying a defined threshold.

The computer node 100 may communicate (block 302) the report message based on the operational condition satisfying a defined rule. For example, when determining (block 300) the operational condition, the computer node 100 may detect a possible operational fault (e.g., application processing errors, protected memory space access violations, insufficient available resources, etc.) of the computer node 100 or the monitored device and, responsive thereto, communicate (block 302) the report message to publish the information indicative of the possible operational fault through the social media server 120 to the other computer nodes 130.

The computer node 100 can communicate (block 302) the report message by posting to the social media server 120 the information with an identifier (e.g., Twitter™ # tag, Facebook™ member identifier, etc.) that is tracked by the other computer nodes 130. Alternatively or additionally, the computer node 100 can communicate (block 302) the report message to the social media server 120 as a web feed (such as a Really Simple Syndication (RSS) feed) containing the information with an identifier that is tracked by the other computer nodes 130. For example, the computer node 100 can communicate fault status information for posting on a Twitter™ social media server, and can cause these posts to be grouped together, for consumption by the other computers nodes 130, by topic or type by use of hashtags—words or phrases prefixed with a "#" sign.

The computer node 100 may select the identifier from among a plurality of defined identifiers that identify different groupings of messages published by the social media server 120 which can be separately tracked by the other computer nodes 130, and may select an identifier which identifies different groupings of web feeds maintained by the social media server 120 which can be separately tracked by the other computer nodes 130. The identifier may be selected based on the determined operational condition. For example, when the operational condition is indicative of a possible operational fault, the computer node 100 may select an identifier that targets other computer nodes (or users of such computer nodes) that track and provide assistance with assessment of faults and recommendation of remedial actions.

The social media server 120 publishes (block 304) the information by, for example, posting the information and/or providing a web feed of the information, to the other computer nodes 130 that are tracking the associated identifier. As explained above, the report message generated by the computer node 100 may contain a text string informational description of the operational condition determined by the computer node 100. The social media server 120 may publish the text string informational description. The publishing may include posting via a blog network server 124 (e.g., post on blog via Tumbler™, server providing Web2.0 Properties/Networks, etc.), via a micro blog network server 126 (e.g., tweet via Twitter™), via a social network server 122 (e.g., post on a Facebook™ user wall), or via another social media server 128.

The other computer nodes 130 have earlier registered with the social media server 120 to track certain identifiers (e.g., registered to follow Twitter™ # tag subject matter), and then operate to track (block 306) the identifier associated with the posted and/or web fed information regarding the operational condition. One or more users 140 may operate the computer nodes 130 to analyze (block 312) the posted and/or web fed operational information, and can communicate (block 314) a response message containing analysis information of or other response to the operational information through the computer nodes 130 for posting and/or web feed back to the social media server 120. Alternatively or additionally, one or more of the computer nodes 130 may analyze (block 308) the posted and/or web fed operational data, and communicate (block 314) a response message containing analysis information or other response to the operational information through the computer nodes 130 for posting and/or web feed back to the social media server 120.

In one example, the other computer nodes 130 analyze (block 308) the posted/web fed operational information to, for example, confirm occurrence of a fault and identify candidate causes of the fault and may further identify proposed remedial actions to be taken by the computer node 100. One or more of the computer nodes 130 may communicate (block 310) a response message through a message posting and/or through a web feed format (e.g., RSS) to the social media server 120, for publication to the computer node 100.

The analysis information generated by the responding one or more computer nodes 130 may indicate a remedial action for the computer node 100 to take to remedy at least one of: an error associated with the computer node 100 processing an application; a protected memory space access violation by an application being processed by the computer node 100; an available memory space of the computer node 100 that is usable to process an application not satisfying a defined threshold; an available communication bandwidth of the computer node 100 that is usable by an application not satisfying a defined threshold; and an available processing bandwidth of the computer node 100 that is used to process an application not satisfying a defined threshold.

The responding one or more computer nodes 130 may select, based on the operational condition, an identifier from among a plurality of defined identifiers that identify different groupings of messages published by the social media server 120 which can be separately tracked by the computer node 100. The responding one or more computer nodes 130 can then include the selected identifier in the response message communicated (block 310) to the social media server 120 for publication (block 318).

In this manner, the responding one or more computer nodes 130 can direct the response message back to the computer node 100 with the identifier selected to cause the computer node 100 to determine that the response message has been provided responsive to the earlier communicated report message (block 302). The responding one or more computer nodes 130 can alternatively or additionally redirect (e.g., using conventional Twitter™ social media communication operations, such as reposting a message from Twitter™ using "RT" in the message and sharing it with other computer nodes 130 following same) the response message to other ones of the computer nodes 130 which are tracking the identifier selected to solicit their assistance with analysis of the operational condition reported from the computer node 100. These other ones of the computer nodes 130 can then respond back through the social media server 120 with an identifier that is tracked by the computer node 100 and/or respond back through another computer node 130 for relay to the computer node 100 via the social media server 120.

The social media server 120 publishes (block 318) content of the response message received in the response message from the other computer nodes 130 by, for example, posting the content of the response message and/or providing a web feed of the content of the response message, to the computer node 100 which receives the content of the response message by tracking (block 320) the associated identifier of the posted content. The computer node 100 may operate to identify one of the informational postings by one or more of the other computer nodes 130 as being responsive to the report message (block 302). The computer node 100 operates (block 322) based on the content of the response message.

The computer node 100 may select an action among a plurality of defined actions based on the one of the informational postings (block 308) identified as being responsive to the report message (block 302), and perform the action selected among the plurality of defined actions.

Example operations of the computer node 100 that may be controlled based on content of the response message can include, but are not limited to, selecting among defined remedial actions for correcting an operational fault and performing the selected remedial action to attempt to reduce or eliminate the operational fault and/or compensate for operational effects of the operational fault. In this manner, the computer node 100 can detect operational conditions that are indicative of a possible operational fault during operation of the computer node 100 or operation of another device being monitored by the computer node 100, publish information characterizing the operational conditions through the social media server 120 to allow the other computer nodes 130 and/or users 140 to analyze and publish suggested remedial actions that the computer node can receive and used to reduce, eliminate, or compensate for the operational fault.

Through these operation, the computer node 100 can leverage the collective knowledgebase of a community of other computer nodes 130 and/or users 140 who have a shared social media connection (e.g., a community of the same brand or model of computer systems, hardware components, operating systems, software applications, person's having similar responsibilities (e.g., information technology) within companies, etc.) to assess and provide assistance to one another with fault identification and remedial action, resource planning, and/or any other operations of the computer system 100.

Figure 4:
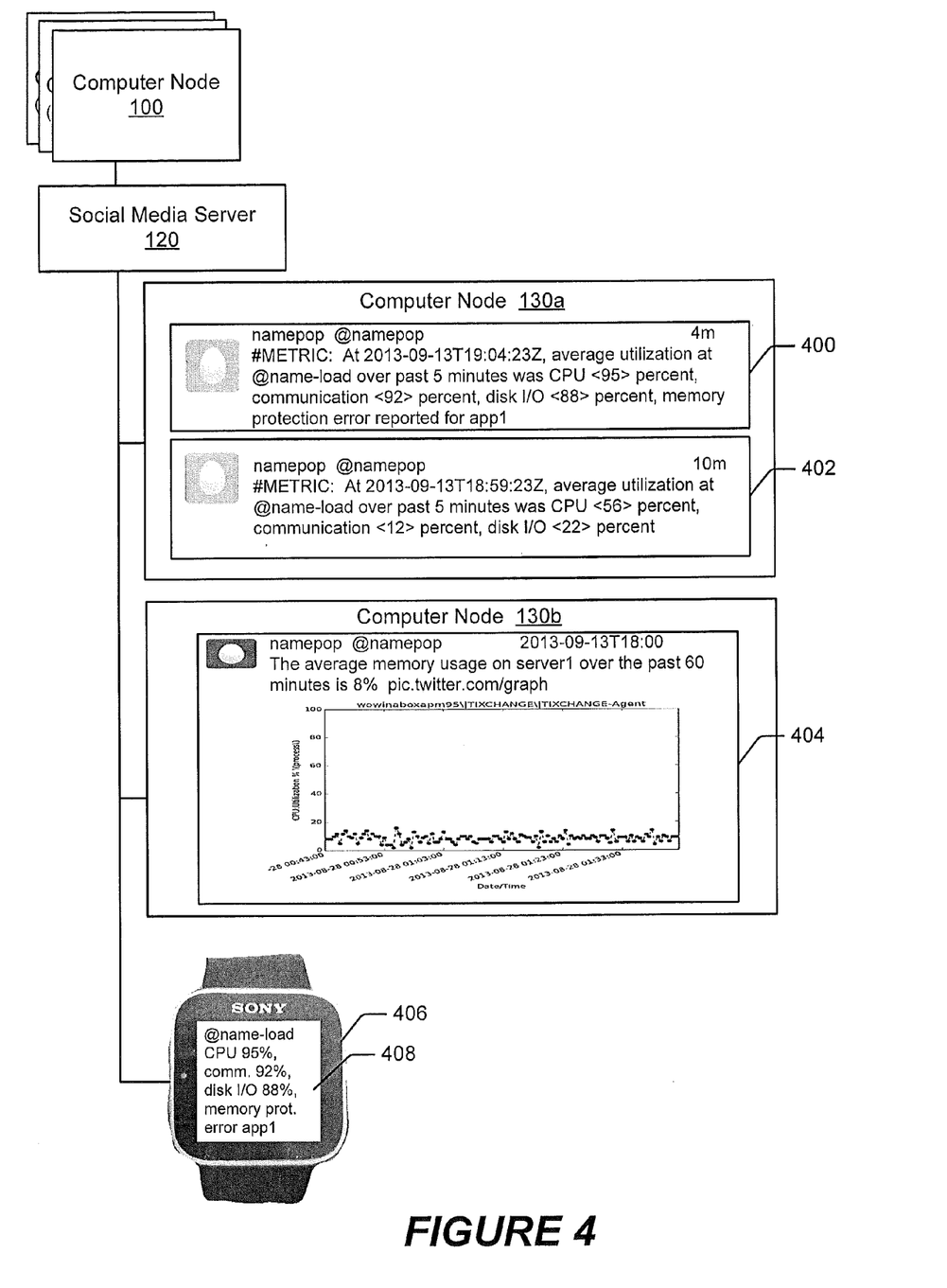
FIG. 4 illustrates example report messages that have been posted by a computer node through a social media server for display to users through various devices, in accordance with some embodiments.

FIG. 4 illustrates example report messages that have been posted and/or web fed by one or more computer nodes 100 through a social media server 120 for display to users through a computer node 130a, another computer 130b, and a smart watch 406 which are tracking such postings and/or web feeds. Referring to FIG. 4, the computer node 130a tracks postings made as "#METRIC" and responds to content of the posted report messages by displaying a textual report 402 containing example operational information that 10 minutes ago the computer node identified as "namepop" observed an average CPU utilization over the past five minutes of 56%. The computer node 130a subsequently responded to content of the posted report messages by displaying a textual report 400 containing example operational information that four minutes ago the computer node identified as "namepop" has observed an average CPU utilization over the past five minutes of 95%. The rapid increase in CPU utilization from 10 minutes ago to 4 minutes ago may be analyzed by the computer node 130a or a user thereof as being indicative of a fault with a particular application executed by the computer node 100, and may post a response message through the social media server 120 containing a remedial action to be taken by the computer node 100 (e.g., terminate the application, lower execute priority of the application, etc.).

Another computer node 130b tracks operational information from the social media server 120 that is sourced from one or more of the computer nodes 100. The computer node 130b displays a graph 404 that is posted as a picture "pic.twitter.com/graph" with a tracking identifier being followed and/or the computer node 130b generates the graph 404 based on information received via a web feed having the tracking identifier. The computer node 130b also displays a textual report indicating that the average memory usage on "server1" over the past 60 minutes is 8%.

A smart watch 406 (i.e., another type of computer node) tracks information posted by one or more of the computer nodes 100, and displays information 408 indicating that "@name-load" has a CPU utilization of 95%, communication utilization of 92%, disk input/output (I/O) utilization of 88%, and has experienced a memory access protection error in application "app1". The high CPU, communication, and disk I/O utilization coupled with the memory access protection error in application "app1" may be analyzed by an application on the smart watch 406 or a user thereof as being indicative of a fault with application "app1" executed by the computer node 100, and may post a response message through the social media server 120 containing a remedial action for the computer node 100 to, for example, terminate application "app1", reduce execution priority of application "app1", etc.

Figure 5:
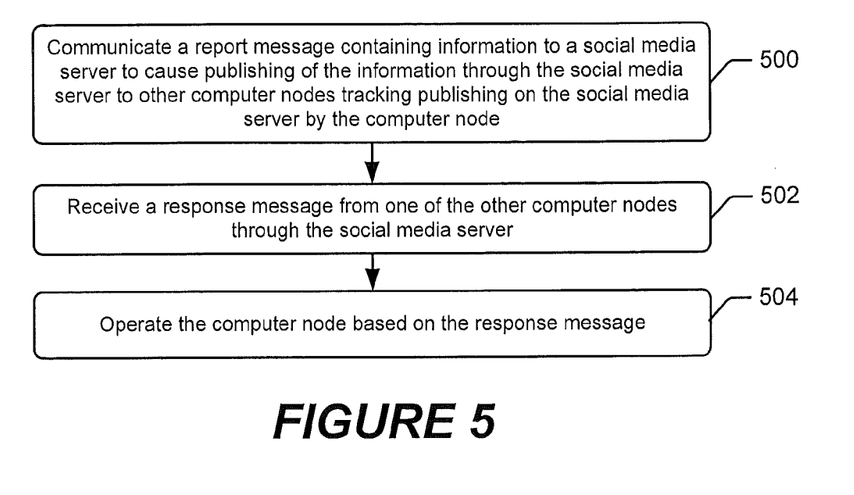
FIGS. 5-7 are flowcharts that illustrate operations that may be performed by a computer node for using a social media server to convey report messages to other computer nodes, and operate based on response messages from the other computer nodes.
Figure 6:
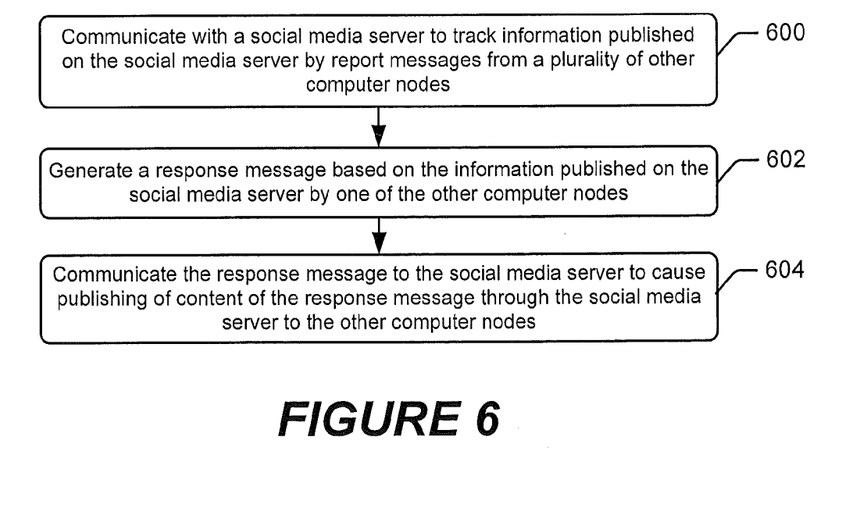
Figure 7:
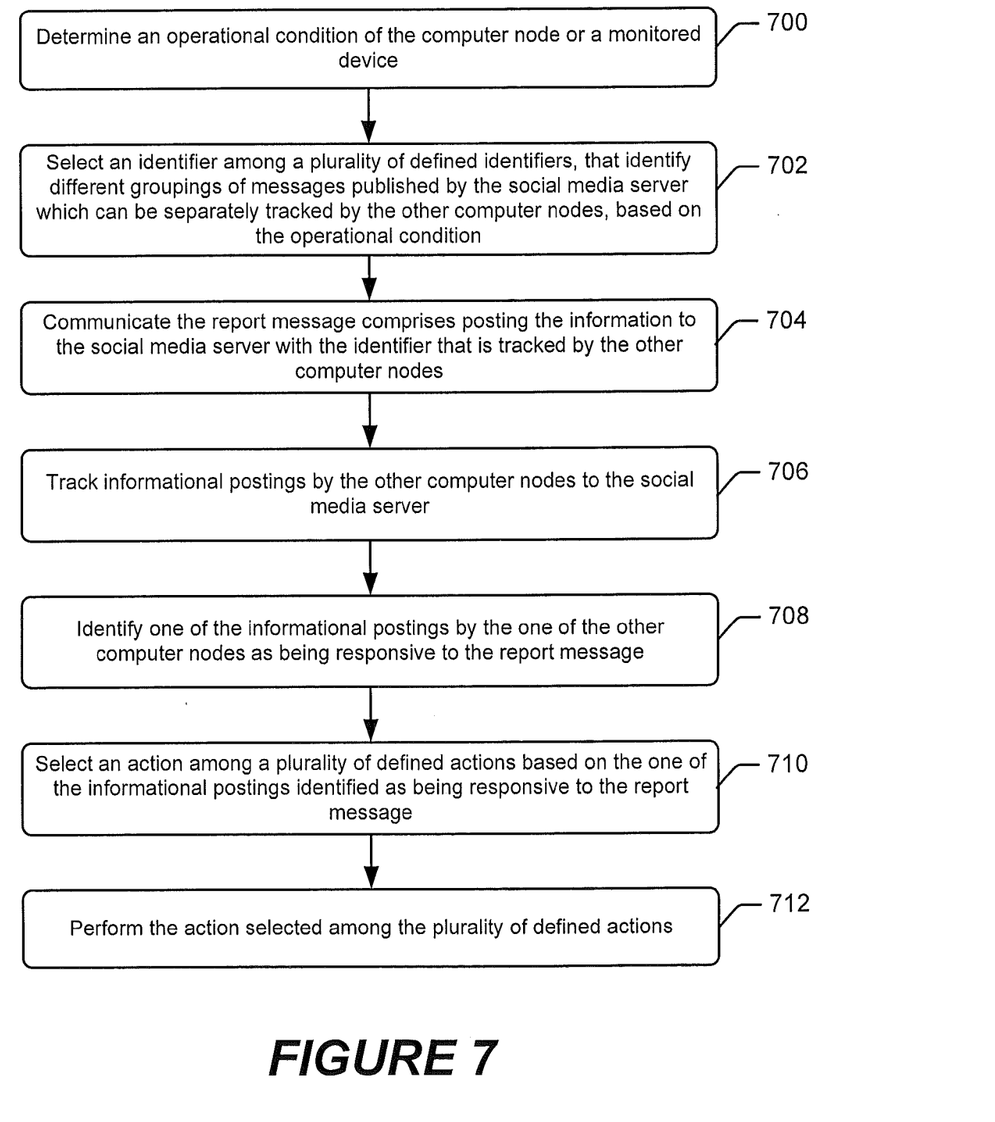

Although various embodiments have been described in the context of FIGS. 1-4, these embodiments another other embodiments are not limited thereto. FIGS. 5 and 7 are flowcharts that illustrate more general operations that may be performed by a computer node that uses a social media server to publish report messages to other computer nodes, and that operates based on response messages from the other computer nodes. FIG. 6 is a flowchart that illustrates general operations that may be performed by a computer node for using a social media server to receive report messages from other computer nodes, and to provide response messages to the other computer nodes via the social media server.

Referring to FIG. 5, a computer node communicates (block 500) a report message containing information to a social media server to cause publishing of the information through the social media server to other computer nodes tracking publishing on the social media server by the computer node. The computer node receives (block 502) a response message from one of the other computer nodes through the social media server, and operates (block 504) based on the response message.

Referring to FIG. 7, the computer node can determine (block 700) an operational condition of the computer node or a monitored device. The computer node selects (block 702) an identifier from among a plurality of defined identifiers that identify different groupings of messages published by the social media server which can be separately tracked by the other computer nodes. The computer node communicates the report message by posting (block 704) the information to the social media server with the selected identifier that is tracked by the other computer nodes. The computer node tracks (block 706) informational postings by the other computer nodes to the social media server. The computer node identifies (block 708) that one of informational postings by one of the other computer nodes was posted responsive to earlier the report message from the computer node. The computer node selects (block 710) an action among a plurality of defined actions based on the informational posting that was identified (block 708). The computer node then performs (block 712) the action selected among the plurality of defined actions.

Referring to FIG. 6, another computer node communicates (block 600) with the social media server to track information that is published by report messages from a plurality of other computer nodes. The computer node generates (block 602) a response message based on the information published on the social media server by one of the other computer nodes. The computer node then communicates (block 604) the response message to the social media server to cause publishing of content of the response message through the social media server to the other computer nodes. In this way, the computer node can track postings by other computer nodes and can provide responsive analysis back to one or more of those computer nodes.

Further Definitions and Embodiments

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus, and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" or "/" includes any and all combinations of one or more of the associated listed items.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A computer node comprising:
   a processor; and
   a memory coupled to the processor and comprising computer readable program code that when executed by the processor causes the processor to perform operations comprising:
      generating information indicating an operational condition of the computer node;
      communicating a report message containing the information to a social media server to cause publishing of the information through the social media server to other computer nodes tracking publishing on the social media server by the computer node;
      tracking informational postings by the other computer nodes to the social media server;
      identifying one of the informational postings by one of the other computer nodes as being responsive to the report message;
      selecting an action among a plurality of defined actions based on the one of the informational postings identified as being responsive to the report message; and
      performing the action that is selected among the plurality of defined actions.

2. The computer node of claim 1, wherein the operations further comprise:
   selecting an identifier from among a plurality of defined identifiers that identify different groupings of messages published by the social media server which can be separately tracked by the other computer nodes, based on the information indicating the operational condition of the computer,
   wherein the communicating the report message comprises posting the report message to the social media server with the identifier that is selected from among the plurality of defined identifiers based on the information indicating the operational condition of the computer.

3. The computer node of claim 1, wherein the operations further comprise:
   selecting an identifier from among a plurality of defined identifiers that identify different groupings of web feeds maintained by the social media server which can be separately tracked by the other computer nodes, based on the information indicating the operational condition of the computer,
   wherein communicating the report message to the social media server comprises communicating a web feed containing the information with the identifier that is selected from among the plurality of defined identifiers based on the information indicating the operational condition of the computer.

4. The computer node of claim 3, wherein the web feed comprises a Really Simple Syndication (RSS) feed containing the information with the identifier that is tracked by the other computer nodes.

5. The computer node of claim 1, wherein generating the information indicating the operational condition of the computer node, comprises:
   generating a text string informational description of the operational condition; and
   embedding the text string informational description in the report message.

6. The computer node of claim 1, wherein generating the information indicating the operational condition of the computer node, comprises:
   generating a graphical informational description of the operational condition; and
   embedding the graphical informational description in the report message.

7. The computer node of claim 1, wherein generating the information indication of the operational condition of the computer node comprises indicating at least one of an error arising while processing an application on the computer node, a protected memory space access violation by an application while being processed on the computer node, an available memory space of the computer node that is usable to process an application not satisfying a defined threshold, an available communication bandwidth of the computer node that is usable by an application not satisfying a defined threshold, and an available processing bandwidth of the computer node that is used to process an application not satisfying a defined threshold.

8. A method comprising:
   performing operations as follows on a processor of a computer node:
      generating information indicating an operational condition of the computer node;
      communicating a report message containing the information to a social media server to cause publishing of the information through the social media server to other computer nodes tracking publishing on the social media server by the computer node;
      tracking informational postings by the other computer nodes to the social media server;
      identifying one of the informational postings by one of the other computer nodes as being responsive to the report message;
      selecting an action among a plurality of defined actions based on the one of the informational postings identified as being responsive to the report message; and
      performing the action that is selected among the plurality of defined actions.

9. The method of claim 8, wherein the operations further comprise:
   selecting an identifier from among a plurality of defined identifiers that identify different groupings of messages published by the social media server which can be separately tracked by the other computer nodes, based on the information indicating the operational condition of the computer,
   wherein the communicating the report message comprises posting the report message to the social media server with the identifier that is selected from among the plurality of defined identifiers based on the information indicating the operational condition of the computer.

10. The method of claim 8, wherein the operations further comprise:

selecting an identifier from among a plurality of defined identifiers that identify different groupings of web feeds maintained by the social media server which can be separately tracked by the other computer nodes, based on the information indicating the operational condition of the computer, wherein communicating the report message to the social media server comprises communicating a web feed containing the information with the identifier that is selected from among the plurality of defined identifiers based on the information indicating the operational condition of the computer.

11. The method of claim 10, wherein the web feed comprises a Really Simple Syndication (RSS) feed containing the information with the identifier that is tracked by the other computer nodes.

12. The method of claim 8, wherein generating the information indicating the operational condition of the computer node, comprises:

generating a text string informational description of the operational condition; and embedding the text string informational description in the report message.

13. The method of claim 8, wherein generating the information indicating the operational condition of the computer node, comprises:

generating a graphical informational description of the operational condition; and embedding the graphical informational description in the report message.

14. The method of claim 8, wherein generating the information indication of the operational condition of the computer node comprises indicating at least one of an error arising while processing an application on the computer node, a protected memory space access violation by an application while being processed on the computer node, an available memory space of the computer node that is usable to process an application not satisfying a defined threshold, an available communication bandwidth of the computer node that is usable by an application not satisfying a defined threshold, and an available processing bandwidth of the computer node that is used to process an application not satisfying a defined threshold.

\* \* \* \* \*